(12) United States Patent
Kesiraju et al.

(10) Patent No.: US 11,500,638 B1
(45) Date of Patent: Nov. 15, 2022

(54) HARDWARE COMPRESSION AND DECOMPRESSION ENGINE

(71) Applicant: Apple Inc., Cupertino, CA (US)

(72) Inventors: Aditya Kesiraju, San Jose, CA (US); James Vash, San Ramon, CA (US); Pradeep Kanapathipillai, Santa Clara, CA (US); Mridul Agarwal, Sunnyvale, CA (US); Zhaoming Hu, Sunnyvale, CA (US); Tyler Huberty, Sunnyvale, CA (US); Charles Tucker, Campbell, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 16/739,464

(22) Filed: Jan. 10, 2020

Related U.S. Application Data

(63) Continuation of application No. 15/192,537, filed on Jun. 24, 2016, now abandoned.

(51) Int. Cl.
  *G06F 9/38* (2018.01)
  *G06F 9/30* (2018.01)
  *G06F 12/0875* (2016.01)

(52) U.S. Cl.
  CPC ........ *G06F 9/3814* (2013.01); *G06F 9/30178* (2013.01); *G06F 12/0875* (2013.01); *G06F 2212/452* (2013.01)

(58) Field of Classification Search
  None
  See application file for complete search history.

(56) References Cited

U.S. PATENT DOCUMENTS

| | | | |
|---|---|---|---|
| 6,320,521 B1 | 11/2001 | Har | |
| 8,610,605 B2 | 12/2013 | Froemmgen | |
| 8,639,849 B2 | 1/2014 | Achler | |
| 2007/0150497 A1 | 6/2007 | De La Cruz et al. | |
| 2007/0226420 A1* | 9/2007 | Sung | G06F 9/30156 711/123 |
| 2014/0006718 A1 | 1/2014 | Ramani-Augustin et al. | |
| 2014/0310574 A1 | 10/2014 | Yu | |
| 2016/0342545 A1* | 11/2016 | Arai | G06F 11/0727 |
| 2017/0004034 A1* | 1/2017 | Stewart | G06F 11/1072 |

* cited by examiner

*Primary Examiner* — John M Lindlof
(74) *Attorney, Agent, or Firm* — Kowert, Hood, Munyon, Rankin & Goetzel, P.C.; Dean M. Munyon

(57) ABSTRACT

A method and system for compressing and decompressing data is disclosed. A compression command may initiate the prefetching of first data, which may be stored in a first buffer. Multiple words of the first data may be read from the first buffer and used to generate a plurality of compressed packets, each of which includes a command specifying a type of packet. The compressed packets may be combined into a group and multiple groups may be combined and stored in a second buffer. A decompression command may initiate the prefetching of second data, which is stored in the first buffer. A portion of the second data may be read from the first buffer and used to generate a group of compressed packets. Multiple output words may be generated dependent upon the group of compressed packets.

17 Claims, 12 Drawing Sheets

| Packet 501 | Packet 502 | Packet 503 | Packet 504 |

*FIG. 5A*

| Payload 505a | Payload 506a | Payload 507a | Payload 508a | Cmd 505b | Cmd 506b | Cmd 507b | Cmd 508b |

*FIG. 5B*

| Memory-Ordering Rules for same address cases |||
|---|---|---|
| Command | Older Command | Action |
| WK-Rd/Wr | LD | LSU will launch Wkdm-op only after older loads have completed |
| WK-Rd | ST | LSU will launch Wkdm-op only after older cacheable stores have been launched |
| WK-Wr | ST | Wkdm-op sent to low-level cache only write counter is zero |
| WK-Rd | WK-Wr | Read-request stalled until write is completed |
| WK-Wr | WK-Wr | Younger write-request stalled until older write is completed |
| LD | WK-Rd/Wr | Younger victimized loads flushed in LSU load queue |
| ST | WK-Rd/Wr | LSU will launch a store only when write counter is zero |

FIG. 9

HARDWARE COMPRESSION AND DECOMPRESSION ENGINE

PRIORITY INFORMATION

The present application is a continuation of U.S. application Ser. No. 15/192,537, filed on Jun. 24, 2016, which is hereby incorporated by reference in its entirety as though fully and completely set forth herein.

BACKGROUND

Technical Field

Embodiments described herein relate to processors or processor cores, and more particularly, to techniques for compression and decompression.

Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

To implement the desired functions on an SoC, one or more processors may be employed. Each processor may retrieve program instructions from memory (commonly referred to as an "instruction fetch"). When fetching such program instructions, a processor may check a hierarchy of local or cache memories for the desired instruction. If the instruction is not available in the hierarchy of local of cache memories, the processor may issue a request to retrieve the desired instruction from main memory or other storage such as, a CD-ROM, or a hard drive, for example.

Some fetched instructions may cause the processor to perform an operation on data stored in system memory or other storage, such as, a hard drive, for example. To reduce an amount of storage for a particular quantity of data, the data may be compressed. Such compression may take advantage of repeated sequences of individual data bits included in the data. When the data is to be accessed, the data may be decompressed, and then re-compressed once the access has been completed.

SUMMARY OF THE EMBODIMENTS

Various embodiments of a computing system are disclosed. Broadly speaking, a system may include circuitry configured to receive a compression command and initiate a prefetch of first data dependent upon the compression command. The first data may be stored in a first buffer. A compression circuit may be configured to read a plurality of input words of the first data from the first buffer and generate a plurality of compressed packets, each of which may depend on a respective one of the plurality of input words, and may include at least a command specifying a type of packet. The compression circuit may be further configured to combine each compressed packet into a first group of compressed packets, and combine two or more groups of compressed packets into a packed group, which may be stored in a second buffer.

In one embodiment, the compression command may include a first target storage location. The circuitry may be further configured to copy the packed group from the second buffer to the first target storage location.

In a further embodiment, the circuitry may be further configured to receive a decompression command, and initiate a prefetch of second data dependent upon the decompression command. The circuitry may be further configured to store the second data in the first buffer.

BRIEF DESCRIPTION OF THE DRAWINGS

The following detailed description makes reference to the accompanying drawings, which are now briefly described.

FIG. 5A illustrates a block diagram depicting an embodiment of a group of packets.

FIG. 5B illustrates a block diagram depicting another embodiment of a group of packets.

FIG. 9 illustrates a diagram depicting memory ordering during operation of a Compression/Decompression Unit.

Figure 1:
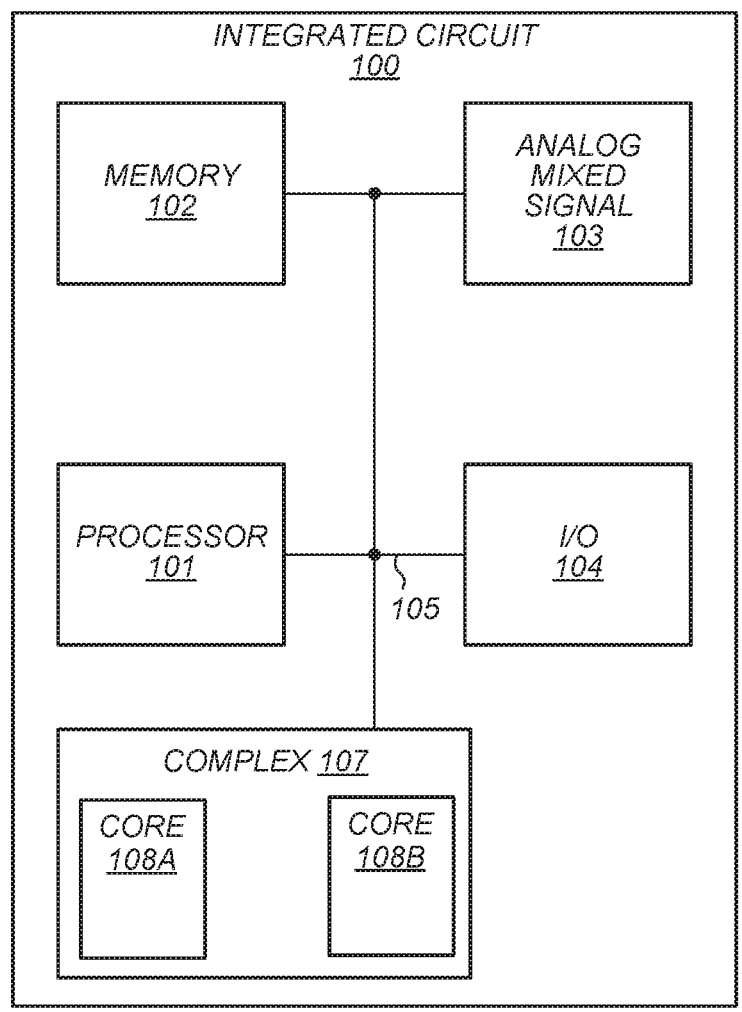
FIG. 1 illustrates an embodiment of an integrated circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

In computing systems pages of data may be stored in system memory. If a desired page of data is unavailable in system memory, an access to another storage device, such as, e.g., a CD-ROM, or hard drive, may be performed. While the access is made to the storage device, the program or application that requested access to the page of data may be suspended until the access is complete, thereby reducing system performance.

Some computing system may employ data compression to reduce an amount of storage needed to store a particular page of data. Such compression may detect repeated sequences of data bits in a page of data and then encode the page of data using a command and/or index to represent a particular sequence of data bits. Each time the particular sequence is detected in the page of data, the command and/or index may be substituted, thereby reducing the total number of data bits to store the page of data. When the compressed page of data is to be accessed, an inverse of the compression process, i.e., decompression, may be performed to return the page of data to its original state.

While performing compression, and a subsequent decompression, numerous program instructions may be executed by a processor. The execution of the program instructions may consume additional power, as well as reduce the available computing resources for other tasks. The embodiments illustrated in the drawings and described below may provide techniques for performing compression and decompression of data pages while limiting the impact to power consumption and performance.

A block diagram of an integrated circuit including multiple functional units is illustrated in FIG. 1. In the illustrated embodiment, the integrated circuit 100 includes a processor 101, and a processor complex (or simply a "complex") 107 coupled to memory block 102, and analog/mixed-signal block 103, and I/O block 104 through internal bus 105. In various embodiments, integrated circuit 100 may be configured for use in a desktop computer, server, or in a mobile computing application such as, e.g., a tablet or laptop computer.

An embodiment of a computing system that may prefetch instructions along a predicted path is illustrated in FIG. 1. As described below in more detail, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA).

Complex 107 includes processor cores 108A and 108B. Each of processor cores 108A and 108B may be representative of a general-purpose processor configured to execute software instructions in order to perform one or more computational operations. Processor cores 108A and 108B may be designed in accordance with one of various design styles and may include one or more cache memories. In various embodiments, coherency may be maintained across cache memories included in processor cores 108A and 108B. It is noted that although only two processor cores are depicted in complex 107, in other embodiments, any suitable number of processor cores may be included in complex 107.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 1, a single memory block is depicted. In other embodiments, any suitable number of memory blocks may be employed.

In some cases, Memory block 102 may store a copy of data also stored in cache memories included in processor cores 108A and 108B. In various embodiments, multiple copies of particular data items may be maintained according to a coherency protocol such as, MOESI, for example. Coherent requests and corresponding responses (collectively "transactions" may be transmitted via bus 105). In other embodiments, additional busses connecting different circuit blocks may be employed. Such additional busses may only support non-coherent commands.

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with wireless networks.

I/O block 104 may be configured to coordinate data transfer between integrated circuit 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between integrated circuit 100 and one or more devices (e.g., other computer systems or integrated circuits) coupled to integrated circuit 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

It is noted that the embodiment illustrated in FIG. 1 is merely an example. In other embodiments, different functional units, and different arrangements of functional units may be employed.

Figure 2:
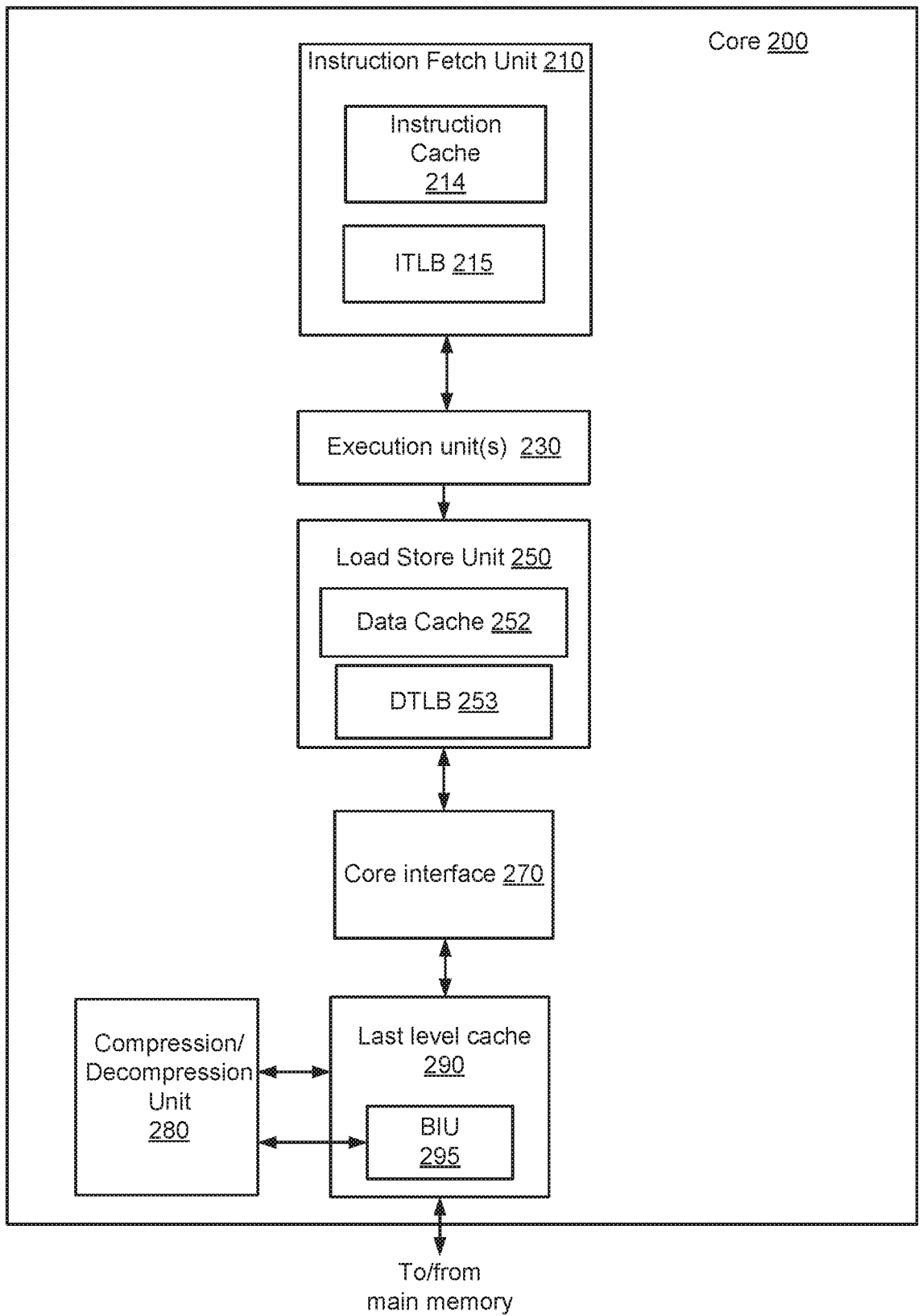
FIG. 2 illustrates a block diagram of an embodiment of a processor core.

A possible embodiment of a cores 108a-b is illustrated in FIG. 2. In the illustrated embodiment, core 200 includes an Instruction Fetch Unit (IFU) 210, a Core Interface 270, Compression/Decompression Unit 280, Execution Units 230, and Last Level Cache 290. Execution units 230 are coupled to Load Store Unit (LSU) 250, which is also coupled to send data back to execution units 230. Additionally, LSU 250 is coupled to Core Interface 270, which may, in turn, be coupled to Last Level Cache 290. In the illustrated embodiment, Last Level Cache 290 includes Bus Interface Unit (BIU) 295, which is coupled to main memory via an on-chip network, such as internal bus 105 as shown in FIG. 1, for example.

Instruction Fetch Unit 210 may be configured to provide instructions to the rest of core 200 for execution. In the illustrated embodiment, IFU 210 may be configured to perform various operations relating to the fetching of instructions from cache or memory, the selection of instructions from various threads for execution, and the decoding of such instructions prior to issuing the instructions to various functional units for execution. Instruction Fetch Unit 210 further includes an Instruction Cache 214. In one embodiment, IFU 210 may include logic to maintain fetch addresses (e.g., derived from program counters) corresponding to each thread being executed by core 200, and to coordinate the retrieval of instructions from Instruction Cache 214 according to those fetch addresses. Additionally, in some embodiments IFU 210 may include a portion of a map of virtual instruction addresses to physical addresses. The portion of the map may be stored in an Instruction Translation Lookaside Buffer (ITLB), such as ITLB 215, for example.

As described below in more detail, Compression/Decompression Unit 280 may, in response to the detecting of a compression or decompression command defined in the ISA for core 200, compress or decompress a page of data. In various embodiments, Compression/Decompression Unit 280 may provide information to Last Level Cache 290 to prefetch a page of data for compression or decompression. In some cases, a request for the page of data may be sent to main memory through BIU 295. The prefetched page of data may be stored in Last Level Cache 290, or other suitable location. Once the prefetched page of data has been stored in Last Level Cache 290, the page of data may be transferred to a read buffer included in Compression/Decompression Unit 280. In various embodiments, Compression/Decompression Unit 280 may compress and decompress data according to the Wilson-Kaplan direct-mapped algorithm, or any other suitable algorithm.

Execution Unit 230 may be configured to execute and provide results for certain types of instructions issued from IFU 210. In one embodiment, Execution Unit 230 may be configured to execute certain integer-type and floating-point instructions defined in the implemented ISA, such as arithmetic, logical, and shift instructions. It is contemplated that in some embodiments, core 200 may include more than one execution unit, and each of the execution units may or may not be symmetric in functionality.

Load Store Unit 250 may be configured to process data memory references, such as integer and floating-point load and store instructions. In some embodiments, LSU 250 may also be configured to assist in the processing of Instruction Cache 214 misses originating from IFU 210. LSU 250 includes Data Cache 352 as well as logic configured to detect cache misses and to responsively request data from a particular cache memory via Cache Interface 270. In one embodiment, Data Cache 252 may be configured as a write-through cache in which all stores are written to a particular cache memory regardless of whether they hit in Data Cache 252. In other embodiments, Data Cache 252 may be implemented as a write-back cache.

In one embodiment, LSU 250 may include a miss queue configured to store records of pending memory accesses that have missed in Data Cache 252 such that additional memory accesses targeting memory addresses for which a miss is pending may not generate additional cache request traffic. In the illustrated embodiment, address generation for a load/store instruction may be performed by one of Execution Unit(s) 230. Depending on the addressing mode specified by the instruction, one of Execution Unit(s) 230 may perform arithmetic (such as adding an index value to a base value, for example) to yield the desired address. Additionally, in some embodiments LSU 250 may include logic configured to translate virtual data addresses generated by Execution Unit(s) 230 to physical addresses. For example, in the present embodiment, LSU 250 includes a Data Translation Lookaside Buffer (DTLB) 253.

It is noted that the embodiment illustrated in FIG. 2 is merely an example and that some circuit blocks have been omitted for clarity. In other embodiments, different numbers of circuit blocks and different arrangements of circuit blocks may be employed.

As mentioned above, additional instructions may be added to the ISA of a processor or processor core, such as, Core 200, for example. In various embodiments, two instructions, wkdmc and wkdmd, may be added for performing compression and decompression, respectively. Each of wkdmc and wkdmd may employ two arguments specifying an address of a source page, and an address of a destination or target page in memory. In some embodiments, each of wkdmc and wkdmd may be converted into multiple micro-operations (also referred to as "micro-ops") for execution by a compression/decompression unit, such as, Compression/Decompression Unit 280, as illustrated in FIG. 2

Figure 3A:
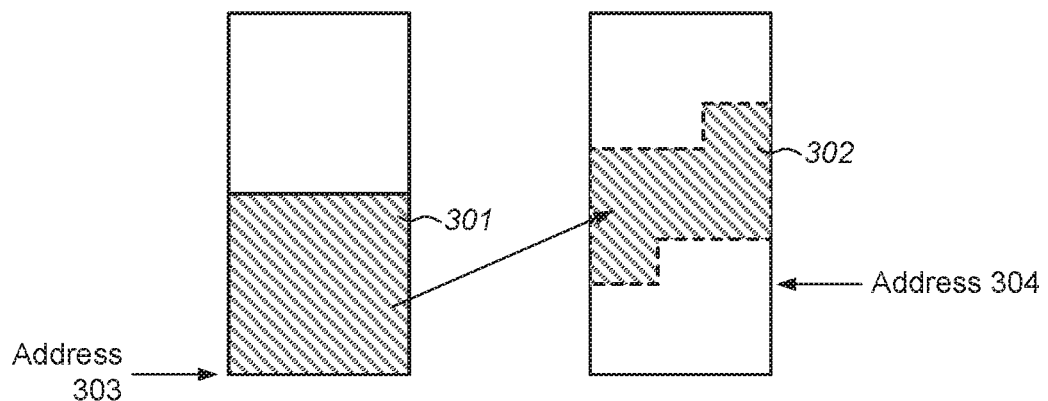
FIG. 3A illustrates a block diagram of a compression operation.

Turning to FIG. 3A, a block diagram depicting a compression operation is illustrated. In the present embodiments, the location of a source page 301, namely Address 303 may be supplied to the wkdmc command. Additionally, Address 304 may be supplied to the wkdmc command in order to specify the location where the compressed page of data 302 is to be stored upon completion of the compression operation. In various embodiments, the size of the source page may be 16 Kbytes or any other suitable page size.

Figure 3B:
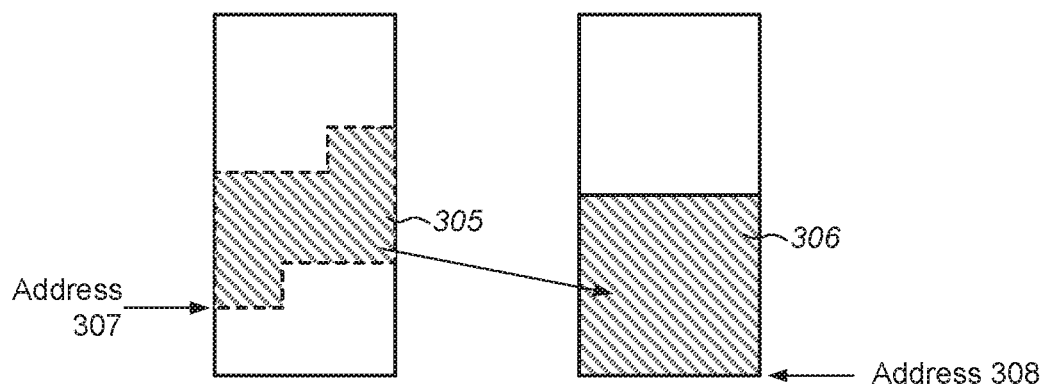
FIG. 3B illustrates a block diagram of a decompression operation.

A block diagram depicted a decompression operation is depicted in FIG. 3B. In the case of a decompression operation, Address 307, which is the location of compressed data page 305, may be supplied to the wkdmd command. Additionally, Address 308 may also be supplied to the wkdmd command in order to specify a destination location for decompressed data page 306. As with the embodiment described in FIG. 3A, the size of decompressed data page 306 may be 16 Kbytes or any other suitable page size.

It is noted that the embodiments depicted in FIG. 3A and FIG. 3B are merely examples. In other embodiments, different methods of specifying source and destination locations may be employed.

During the compression process, a compression/decompression unit, such as, e.g., Compression/Decompression Unit 280, may operate on portions (also referred to herein as "words") of a page of data to be compressed. For example, in some embodiments, the compression/decompression unit may operate on 32-bits of data at one time. As will be described below in more detail, some compression/decompression units may operate on multiple portions of data in parallel in order to improve throughput during compression and decompression operations.

As each portion of the page of data is processed, it is searched for repeated sequences of data bits by comparing against a list of such sequences (commonly referred to as a "dictionary"). Based on the results of the comparison, the compression/decompression unit may create a correspond packet that will be stored as part of the compressed data file.

Figure 4:
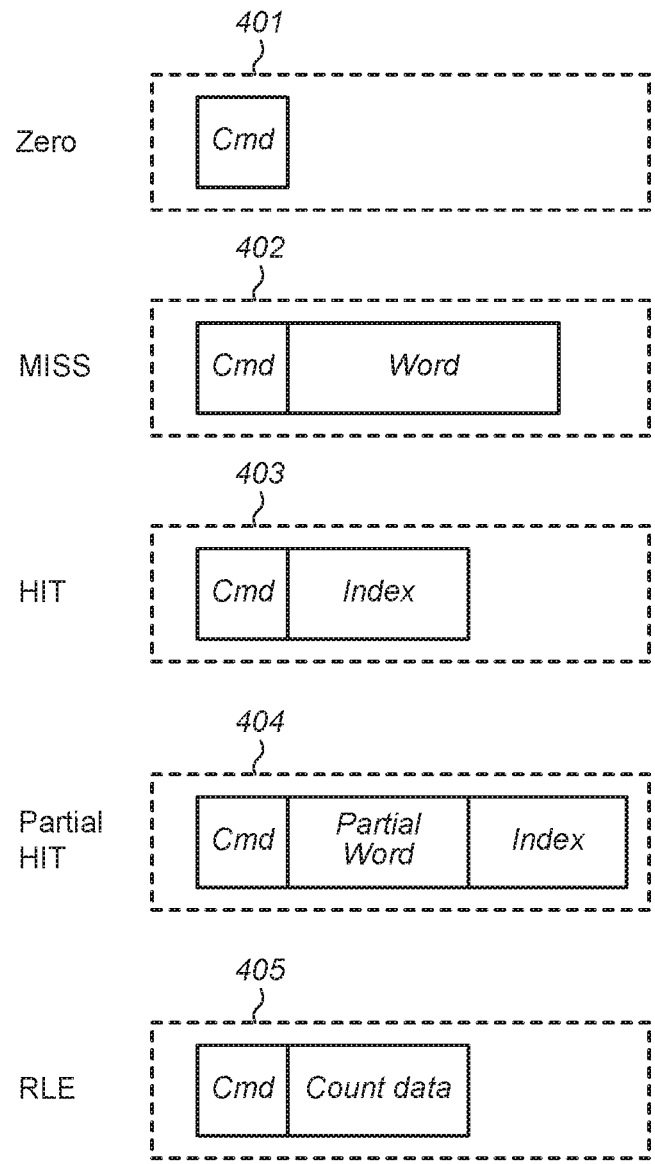
FIG. 4 illustrates different packet types used in a compression operation.

A diagram depicting possible packets is illustrated in FIG. 4. Each packet may include a command and possible other additional information depending upon the results of the comparison to the dictionary. Each command may be a combination of data bits that encode the particular packet type.

If the data bits for a portion of data being operated upon are all zeros, then packet 401 may be used in the compressed page of data for that portion of data. Packet 401 merely includes a command specifying that all the data bits in the uncompressed file were zero.

When the portion of data is compared to the dictionary, one of three possibilities exists. If the sequence of data bits in the portion of data does not match any of the entries in the dictionary, then a miss occurs and packet 402 may be used in the compressed page of data for the portion of data. Packet 402 includes a command designating that this sequence of bits was not found in the dictionary, as well as a copy of the original portion (word) of data. It is noted that in some embodiments, a miss may result in compression/decompression engine modifying the dictionary to include a new entry, provided space is available in the dictionary, that would allow for a match to the portion of the data.

If the portion of data matches an existing entry in the dictionary, then hit has occurred and the packet 403 may be used in the compressed page of data for the portion of data. Packet 403 includes a command indicating that the portion of data matched an entry in the dictionary as well as an index pointing to the matched entry in the dictionary. In various embodiments, the index may be a hash of the portion of the data.

In some cases, the portion of data may partially match an entry in the dictionary. When this occurs, packet 404 may be used in the compressed page of data for the portion of the data. Packet 404 may include a command designating the partial hit, along with an index or hash corresponding to the entry in the dictionary that partially matches the portion of data, along with the partial word from the portion of data that does not match the entry. In various embodiments, the number of bits of data which match between the portion of data and a given entry in the dictionary may be adjustable dependent upon any suitable criteria.

A fifth type of packet may also be employed. Packet 405 may include a command indicating a count of a number of repeated packets. Such packets may be used to replace multiple identical packets with a particular packet followed by a run-length encoding (RLE) packet indicating how may times the particular packet occurred in the sequence. By employing RLE packets, further compression may be achieved by storing only a single copy of a repeated packet in a sequence along with a number of times the packet is to be repeated, instead of all instances of the repeated packet.

The packets types depicted in FIG. 4 are merely an example. In other embodiments, a compression/decompression unit may employ different packet types which may include different arrangements of commands and data.

Compressed packets, such as those illustrated in FIG. 4, may be combined to form a group. FIG. 5A depicts a particular embodiment of a group of compressed packets. In the illustrated embodiment Packets 501 through 504 are concatenated together into a single group that may be written into a target storage location.

In some cases, however, it may be desirable to separate commands from their corresponding payloads in the various packets. An embodiment of a group employing such a technique is illustrated in FIG. 5B. In the illustrated embodiment, Payloads 505a through 508a are concatenated together. Commands, Cmd 505b through 508b, corresponding to Payloads 505a through 508a may then be concatenated onto the previously concatenated payloads.

It is noted that the embodiments depicted in FIG. 5A and FIG. 5B are merely examples. In other embodiments, any suitable arrangement of payloads and commands may be employed.

Figure 6:
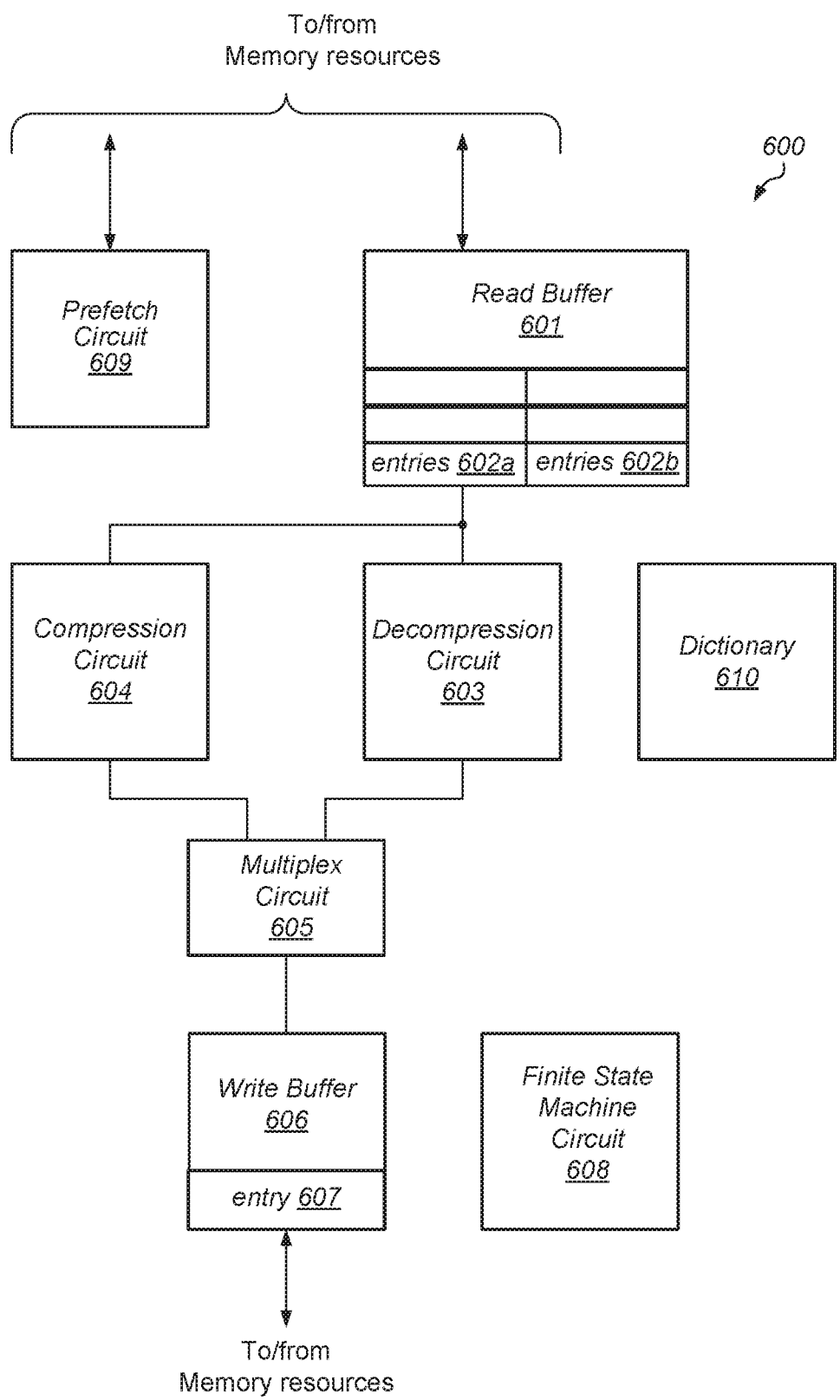
FIG. 6 illustrates a block diagram depicting an embodiment of a Compression/Decompression Unit.

Turning to FIG. 6, an embodiment of a compression/decompression unit is illustrated. Compression/decompression unit 600 may, in various embodiments, correspond to Compression/Decompression Unit 280 as depicted in the embodiment of FIG. 2. In the illustrated embodiment, compression/decompression unit 600 includes Read Buffer 601, Compression Circuit 604, Decompression Circuit 603, Dictionary 610, Multiplex Circuit 605, Write Buffer 606, Finite State Machine Circuit 608, and Prefetch Circuit 609.

Read Buffer 601 may include multiple entries, such as, e.g., entries 602a and 602b, into with portions of a page of data may be stored. In various embodiments, the entries may be organized to allow for the parallel processing of multiple words of data. For example, in some embodiments, the entries may be arranged to allow for the reading of four 32-bit data words by either Compression Circuit 604 or Decompression Circuit 603. Read Buffer 601 may be further configured to receive a ready signal from each of Compression Circuit 604 and Decompression Circuit 603 indicating that the those circuits are ready to receive more data. In some cases, if Read Buffer 601 is not ready to receive requested data, the data may be held in buffers included in a Bus Interface Unit which may be coupled to an communication bus that allows for data to be moved between various cache memories and system memory. In some embodiments, Read Buffer 601 may use a credit-based system to request data from a low-level cache memory, such as, Data Cache 252, for example.

As described below in more detail, each of Compression Circuit 604 and Decompression Circuit 603 may be configured to compress or decompress, respectively, portions of data received from Read Buffer 601. Both Compression Circuit 604 and Decompression Circuit 603 may be configured to implement the Wilson-Kaplan direct-mapped algorithm, or any other suitable compression/decompression algorithm.

As part of compression and decompression operations, Compression Circuit 604 and Decompression Circuit 603 may access Dictionary 610. In various embodiments, Dictionary 610 may include multiple entries, each of which may include a commonly used sequence of bits and a corresponding index. In some cases, Dictionary 610 may be implemented as a content-addressable memory (CAM), which is accessed using a hash created from bits of a particular word of data to be compressed. During compression and decompression operations, Compression Circuit 604 and Decompression Circuit 603 may update one or more entries in Dictionary 610 in order to improve subsequent compression operations. Dictionary 610 may be designed according to one of various designs styles. For example, Dictionary 610 may include multiple latches, flip-flops, or other suitable storage circuits configured to store individual data bits included in the various entries.

Multiplex Circuit 605 may include multiple individual data bit multiplex circuits allowing the selection of an output from either Compression Circuit 604 or Decompression Circuit 603 dependent upon the command being executed.

Finite State Machine Circuit 608 may be configured to generate multiple signals to control the operation of the various other circuit blocks included in compression/decompression unit 600. In various embodiments, Finite State Machine Circuit 608 may receive compression and decompression commands from an Instruction Fetch Unit, and signal Prefetch Circuit 609 to initiate a prefetch of a page of data specified in the received command. Finite State Machine Circuit 608 may additionally, control the copying of data from Write Buffer 606 to target storage locations. In various embodiments, Finite State Machine Circuit 608 may include multiple sequential and combinatorial logic circuits configured to perform the above-referenced functions.

Prefetch Circuit 609 may include any suitable combination of sequential and combinatorial logic circuit that may be configured to fetch a number of lines into a low-level cache, such as, e.g., Data Cache 252 as illustrated in the embodiment of FIG. 2. In some embodiments, Prefetch Circuit 609 may send prefetch requests to the computing system based on a number of available credits. Prefetch Circuit 609 may, in some embodiments, perform the prefetching dependent upon a stride value. For example, in the case of compression, a processor core may prefetch the first N (where N is a positive integer) line of the desired page, and Prefetch Circuit 609 may prefetch from the source address plus N to the end of the desired page of data, incrementing by the stride after each line has been prefetched.

It is noted that the embodiment depicted in the block diagram of FIG. 6 is merely an example. In other embodiments, different circuit blocks and different arrangement of circuit blocks are possible and contemplated.

Figure 7:
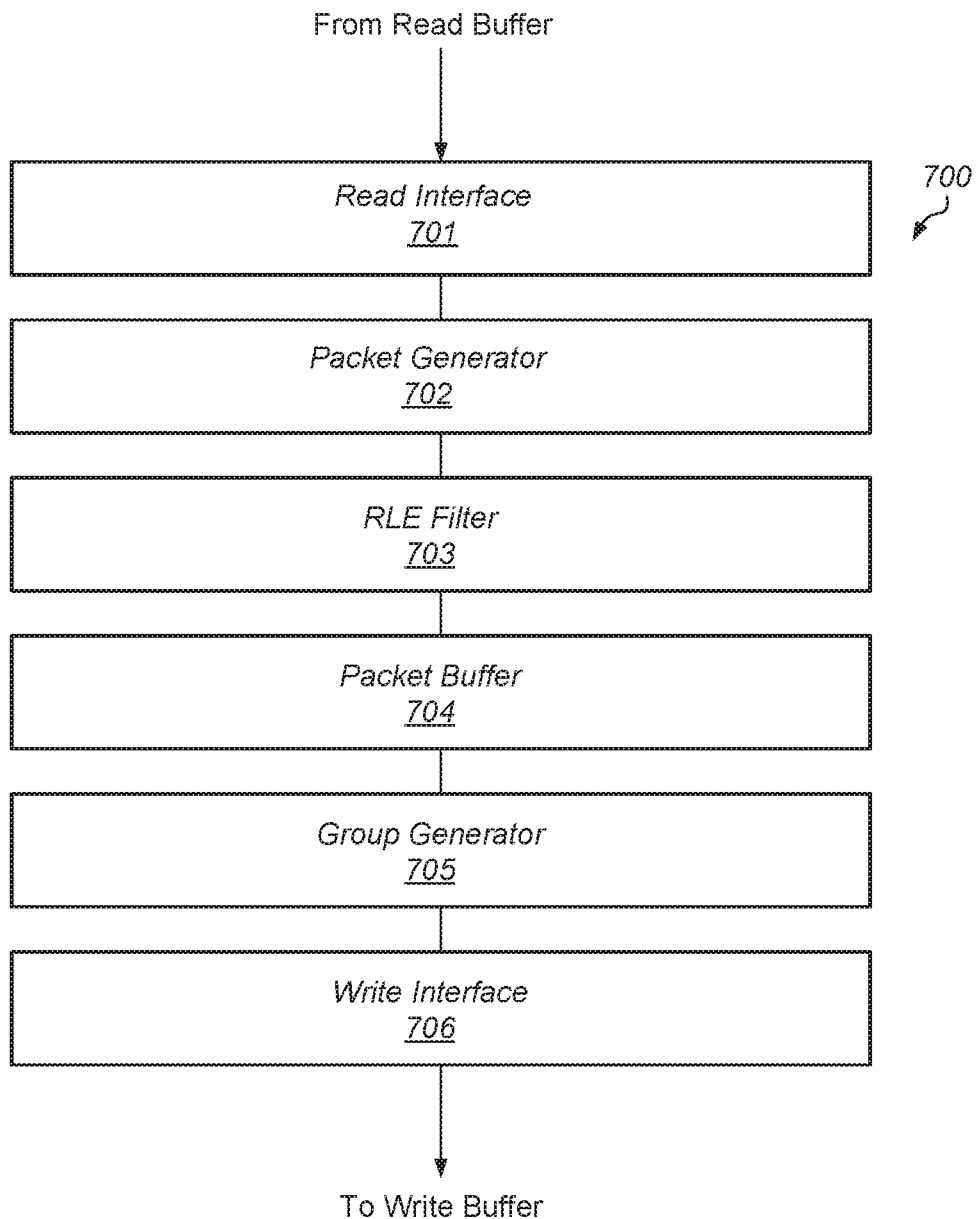
FIG. 7 illustrates a block diagram depicting an embodiment of a Compression Circuit.

An embodiment of a compression circuit is illustrated in FIG. 7. Compression circuit 700 may, in various embodiments, correspond to Compression Circuit 604 as illustrated in the embodiment of FIG. 6. In the illustrated embodiment, compression circuit 604 includes Read Interface 701, Packet Generator 702, RLE Filter 703, Packet Buffer 704, Group Generator 705, and Write Interface 706.

Read Interface 701 may be configured to read multiple words from a read buffer, such as, e.g., Read Buffer 601 as illustrated in FIG. 6. For example, in some embodiments, Read Interface 701 may read four 32-bit words, in parallel, from the read buffer. Read Interface 701 may additional perform some checking on the data read from the read buffer. For example, Read Interface 701 may check to determine if one of the words contain all zeros, if any of the words is the same or partially the same as one or more of the other words. Additionally, Read Interface 701 may compute a hash or index to be used with dictionary lookup, and check to see if any of the words have the same index. In some embodiments, Read Interface 701 may perform an exclusive-OR operation between bits of a particular word in order to generate the index. For example, Read Interface 701 may perform an exclusive-OR operation between bits [17:14] and [13:10] generate the index. Read Interface 701 may include multiple flip-flop circuits in order to store the words before sending them to Packet Generator 702.

Packet Generator 702 may be configured to generate a packet for each of the words received from Read Interface 701. Packet Generator may generate packets similar to those depicted in FIG. 4 by comparing a given word to entries in the dictionary. Packet Generator 702 may determine an appropriate command and payload based on the comparison to the dictionary. Packet Generator 702 may also include multiple flip-flop circuits for storing the generated packets before sending them to RLE Filter 703.

RLE Filter 703 may include a sequential logic circuit or state machine configured to track a sequence of similar packets. The similar packets may be, for example, a sequence of ZERO packets, i.e., packets that include all zero data bits, or a sequence of HIT packets to the same dictionary index. Once a start of a possible sequence is detected, such as, e.g., a ZERO packet, RLE Filter 703 may track a subsequent number of packets in the sequence. Once the sequence ends, RLE Filter 703 may generate a RLE packet indicating a number of times to replicate a particular packet. The initial packet in the sequence and the RLE packet may be stored, thereby reducing a number of packets that need to be stored. The RLE packet may be used during decompression to generate additional copies of the packet starting the sequence.

Packet Buffer 704 may include multiple flip-flop or other suitable storage circuits necessary to store the packets prior to group generation by Group Generator 705. In various embodiments, Group Generator 705 may include multiple multiplex circuits and shift registers. The multiplex circuits and shift registers, along with other logic circuits, may be arranged to allow the formation of a group of packets. The format of the group of packets may, in some embodiments, correspond to the format of the packet group illustrated in FIG. 5B.

Write Interface 706 may include multiple buffers into which groups are packed. In various embodiments, Write Interface 706 may pack multiple groups into a single buffer until the buffer is full, at which point, the contents of the buffer may be written to a write buffer awaiting to be copied into the target storage location. Since packets may be of various sizes, groups may also be of various sizes. As such, multiple groups may be combined in a single buffer. The buffers included in Write Interface 706 may be arranged to allow for pipelined operation within Write Interface 706.

It is noted that the embodiment illustrated in FIG. 7 is merely an example. In other embodiments, different circuit blocks and different arrangement of circuit blocks may be employed.

Figure 8:
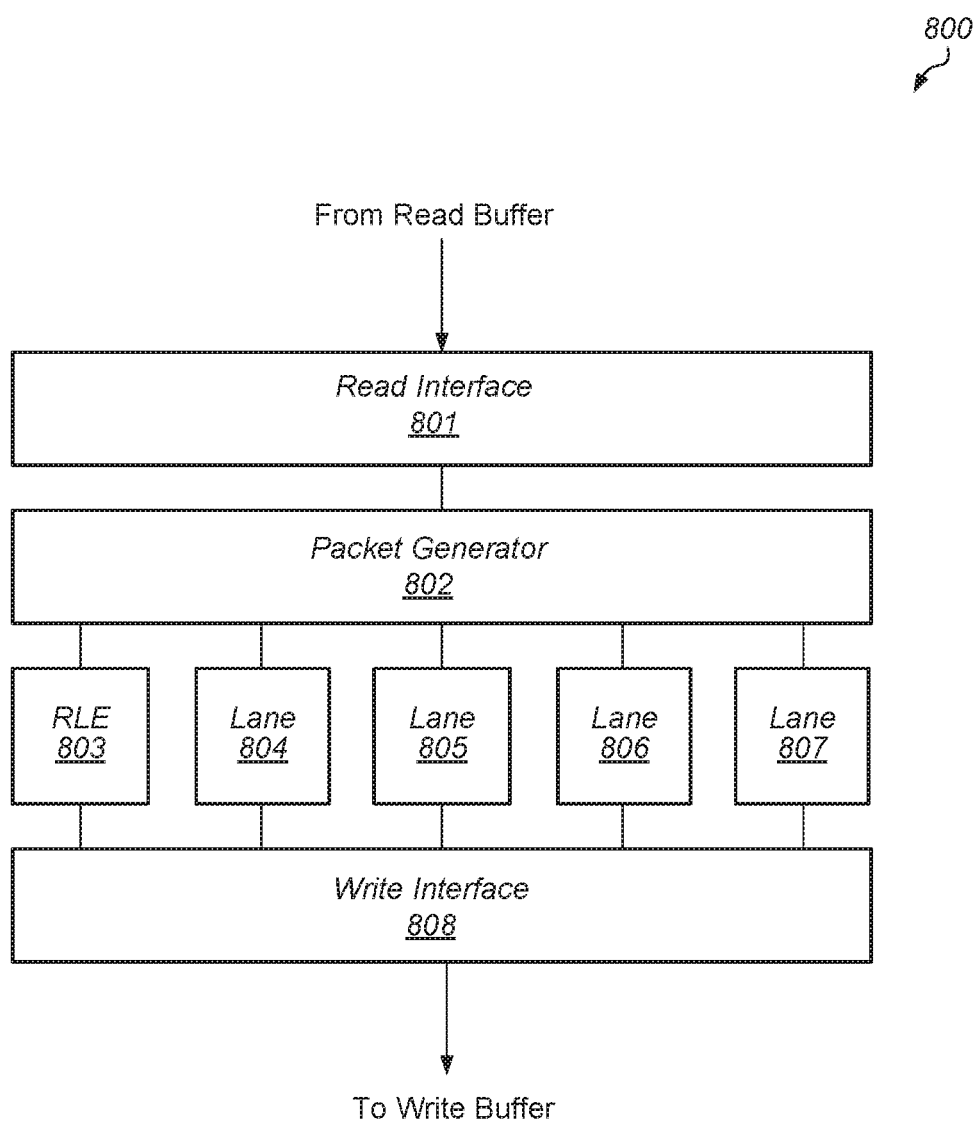
FIG. 8 illustrates a block diagram depicting an embodiment of a Decompression Circuit.

Turning to FIG. 8, a block diagram illustrating an embodiment of a decompression circuit is illustrated. Decompression circuit 800 may, in various embodiments, correspond to Decompression Circuit 603 as illustrated in FIG. 6. In the illustrated embodiment, decompression circuit 800 includes Read Interface 801, Packet Generator 802, RLE unit 803, Lanes 804 through 807, and Write Interface 808. Each of the aforementioned circuit blocks may be coupled together to form a five stage processing pipeline.

Read Interface 801 may be configured to read multiple data words from a read buffer, such as, Read Buffer 601 as depicted in the embodiment of FIG. 6, for example. Each of the multiple data words may be read in parallel. Read Interface 801 may include multiple multiplex and flip-flop circuits in order to rearrange the multiple data words into a group of compressed data packets. For example, in some embodiments, Read Interface 801 may read 16-Bytes of data, and through a series of shift operations, Read Interface 801 may generated a group of four compressed data packets. The group of compressed data packets may, in various embodiments, be organized as depicted in FIG. 5B, with the payloads concatenated together and the commands concatenated to the previously concatenated payloads.

Packet Generator 802 may include multiple multiplex circuits as well as additional logic circuitry configured to isolate the individual payloads from the group and combine the payload with its corresponding command to form a packet of compressed data. In various embodiments, Packet Generator 802 may combine each of the packets into a single RLE packet.

Each of Lanes 804 through 807 may be configured to generate an output data word dependent upon the payload and command of a corresponding packet received from Packet Generator 802. As illustrated in Table 1, each of Lanes 804 through 807 may generate the output data word dependent on the command. It is noted that although Table 1 depicts the use of 32-bit output words, in other embodiments, any suitable number of data bits may be included in an output word.

TABLE 1

Output Word Generation

| Command | Output Word |
|---|---|
| ZERO | 32-bit zero word |
| MISS | 32-bit payload |
| HIT | 32-bit dictionary word |
| PARTIAL | 23-bit dictionary word and 9-bit payload |

RLE unit 803 may be configured to examine each of the packets received from Packet Generator 802 to determine if one of them is a RLE packet. If a RLE packet is detected, RLE unit 803 may generate the appropriate number of packets, either a HIT to a common dictionary entry, or ZERO packets, that may then be combined with remaining packets from Packet Generator 802 and sent to Write Interface 808.

Write Interface 808 may include multiple multiplex circuits configured to combine the words from Lanes 804 through 807, and the output of RLE unit 803 into a single data word that may be written to a write buffer, such as, e.g., Write Buffer 606 as illustrated in FIG. 6, awaiting to be copied into a target storage location.

It is noted that the embodiment illustrated in FIG. 8 is merely an example. In other embodiments, different circuits and different arrangement of circuits may be employed.

During the various read and write operations performed by the circuit blocks included in a compression/decompression unit, checking may be performed to ensure memory-ordering rules are followed. If such rules are not followed, problems may arise with operations being performed on old (also referred to as "stale") data. During prefetch operations and copies from the write buffer of the compression/decompression unit to system memory, such memory-ordering rules may be followed.

A chart depicting actions for various combinations of commands is illustrated in FIG. 9. Compression and decompression commands are depicted by the prefix "WK" in the chart of FIG. 9. In the case when a load command (LD) has been fetched, followed by a read or write operation of a compression/decompression command (WK-Rd/Wr), the LSU unit will only launch the compression/decompression operations after the older load operation has completed.

In the case of a store (ST) operation followed by a read/write operation of a compression/decompression command, the LSU unit will launch the read/write operation of the compression/decompression command after the ST operation is completed.

If a compression/decompression read operation follows a compression/decompression write operation to the same address, then the read operation may be stalled until the write is complete. If a compression/decompression write operation to the same address follows another compression/decompression write operation, the younger write operation may be stalled until the older write operation has completed.

When a compression/decompression, either read or write, is launched, then younger victimized loads may be flushed from the load queue in the LSU.

It is noted that the chart depicted in FIG. 9 is merely an example. Other combinations of commands and older commands are possible, as are different actions that may be performed.

Figure 10:
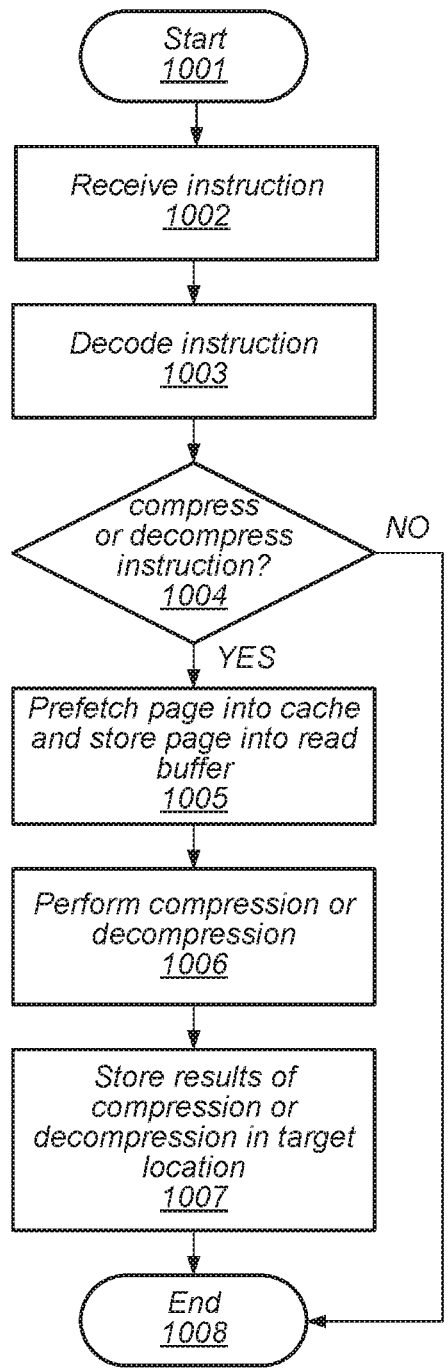
FIG. 10 illustrates a flow diagram depicting an embodiment of a method for operating a Compression/Decompression Unit.

Turning to FIG. 10, a flow diagram depicting an embodiment of a method for operating a compression/decompression unit is depicted. Referring collectively to the embodiment of FIG. 2, and the flow diagram of FIG. 10, the method begins in block 10001. IFU 210 may then receive an instruction (block 1002). In various embodiments, the instruction may be received from Instruction Cache 214 or any other suitable location in system memory. The instruction may then be decoded (block 1003), and the method may depend on the results of decoding the instruction (block 1004).

If the instruction is not a compress or decompress instruction, then the method may conclude in block 1008. Alternatively, if the instruction is a compress or decompress instruction, then Compression/Decompression Unit 280 may then initiate a prefetch of a page of data (block 1005). The page of data may be stored in Data Cache 252 or any other suitable low-level cache memory before being copied to a read buffer included in the compression/decompression unit. In some embodiments, a first number of lines may be prefetched by the processor or processor core, and the remaining lines remaining in the desired page of data may be prefetched by a dedicated circuit included in the compression/decompression unit. The dedicated circuit may prefetch using a predetermined stride value, which may be different for compression and decompression operations.

Circuitry included in Compression/Decompression Unit 280 may then transfer the page of data to a read buffer included in Compression/Decompression Unit 280 and perform the desired compression or decompression operation (block 1006). In various embodiments, the compression or decompression operation may be performed in accordance with one of various algorithms, such as, Wilson-Kaplan direct-mapped algorithm, for example. The results of the compression or decompression operation may be stored in a write buffer included in Compression/Decompression Unit 280 prior to storing the results in the target location (block 1007). Once the results of the compression or decompression operation have been stored in the target location, the method may conclude in block 1008.

The embodiment of the method depicted in the flow diagram of FIG. 10 is merely an example. In other embodiments, different operations and different orders of operations may be employed.

Figure 11:
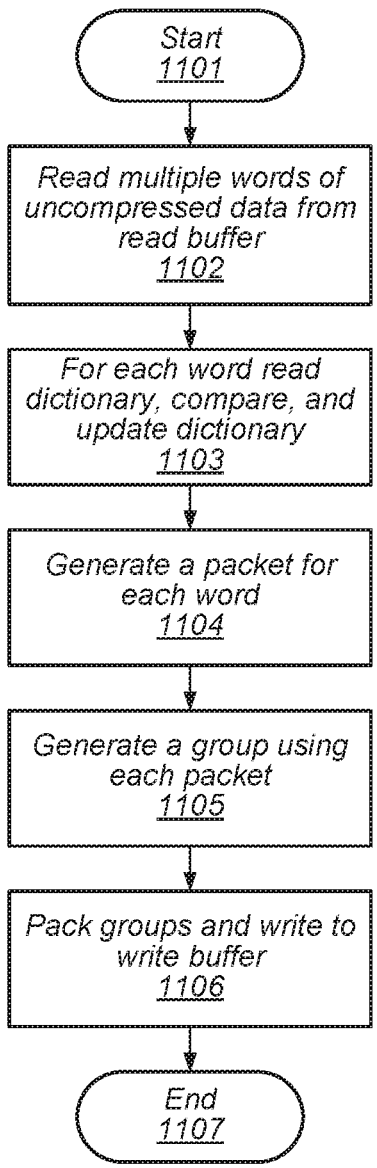
FIG. 11 illustrates a flow diagram depicting an embodiment of a method for operating a Compression Circuit.

A flow diagram depicting an embodiment of a method for operating a compression circuit is illustrated in FIG. 11. Referring collectively to the block diagram of FIG. 7 and the flow diagram of FIG. 11, the method begins in block 1101. Read interface circuit may then read multiple words of uncompressed data from a read buffer (block 1102). As described above in regard to FIG. 6, the read buffer may have multiple partitions or sub-blocks allowing for the multiple words of data to be read in parallel.

Packet Generator 702 may then compare each word of data to the dictionary (block 1103). In some cases, such as, e.g., a miss, an entry may be modified or added to the dictionary for use with a subsequent word of data. Packet Generator 702 may then generate a packet corresponding to each word of data (block 1104). As described above in regard to FIG. 4, depending on the results of the comparison to the dictionary a packet may be generated that includes a command indicating the type of packet, and a corresponding payload. In some cases, based on the results of the comparison of each word of data, RLE filter 703 may generate a packet containing information indicative of a sequence found within the generated packets. For example, if all of the generated packets correspond to all zero words, then a single packet generated by RLE Filter 703 may indicate such a situation, thereby allowing for the use of a single packet as opposed to four separate packets, further improving compression efficiency. Each generated packet may be stored in Packet Buffer 704.

Group generator 705 may then generate a group using the generated packets (block 1105). In various embodiments, the commands and payloads of the various packets may be reordered such that the commands are located together within a particular group. In some cases, RLE information may be included within the generated group.

Group Generator 705 may then pack multiple groups together in a write buffer before Write Interface 706 initiates the storage of the multiple groups into the target storage location (block 1106). For example, in some embodiments, multiple groups may be packed together until 16-Bytes of data have been accumulated. Once 16-Bytes of data have been accumulated, the packed data may be written to the write buffer awaiting storage in the target storage location. Once the compressed data has been stored in the target storage location, the method may conclude in block 1107.

It is noted the embodiment of the method depicted in the flow diagram of FIG. 11 is merely an example. In other embodiments, different operations and different arrangements of operations are possible and contemplated.

Figure 12:
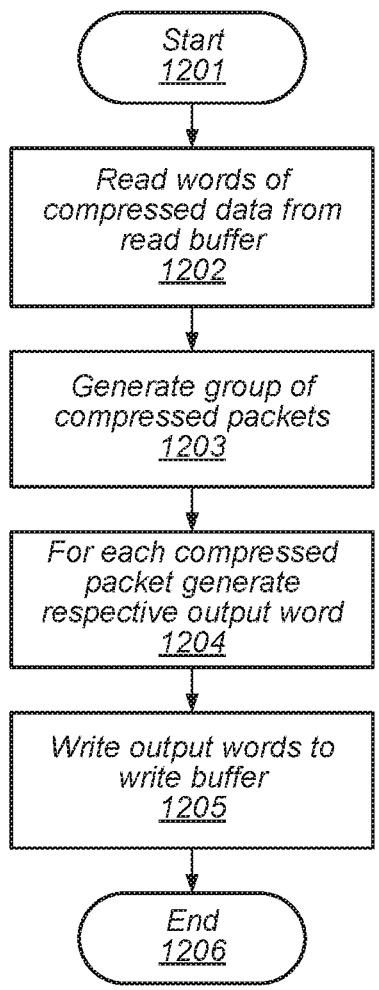
FIG. 12 illustrates a diagram depicting memory an embodiment of a method for operating a Decompression Circuit.

Turning to FIG. 12, a flow diagram depicting an embodiment of a method for operating a decompression circuit is illustrated. Referring collectively to the embodiment of FIG. 8, and the flow diagram of FIG. 12, the method begins in block 1201. Read interface 801 may then read multiple words from a read buffer (block 1202). In various embodiments, the multiple words may be read in parallel from respective partitions or sub-blocks included in the read buffer.

Packet Generator 802 may then assemble the words of data into a group of compressed packets (block 1203). In various embodiments, the words of data may include both commands and payloads, and Packet Generator 802 may re-order the various commands and payloads to that each command is located next to its corresponding payload.

Lanes 804 through 807 may then generate a respective output word of data (block 1204). Each of Lanes 804 through 807 may operate on a respective packet and examine its corresponding command and re-construct the uncompressed data based on the command and associated payload. RLE unit 803 may operate on any RLE packets found amongst the packets generated by Packet Generator 802. Based on information in a RLE packet, RLE 803 may generate multiple zero or hit (to the same index) packets.

Each of the generated packets may then be stored in a write buffer awaiting storage in the target storage location by Write Interface 808 (block 1205). Once the generated packets have been stored in the write buffer, the method may conclude in block 1206.

The method depicted in the flow diagram of FIG. 12 is merely an example. In other embodiments, different operations and different orders of operations may be employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a cache memory configured to store a plurality of pages of data; and
    a compression/decompression circuit configured to:
        receive a compression command to store a compressed version of a page of uncompressed data;
        send a first request to the cache memory for the page of uncompressed data;
        wherein the cache memory is further configured to, in response to a determination that the page of uncompressed data is not stored in the cache memory, initiate a prefetch of the page of uncompressed data;
        wherein the compression/decompression circuit is further configured to:
            receive the page of uncompressed data from the cache memory; and
            generate, for a given input word of a plurality of input words included in the page of uncompressed data, a compressed packet that includes a payload corresponding to the given input word, and a compression command specifying a type of compression used to compress the given input word;
            generate, using a plurality of compressed packets corresponding to the plurality of input words, a compressed packet group that includes a first part including a concatenation of payloads of the plurality of compressed packets, and a second part including a concatenation of compression commands included in the plurality of compressed packets; and
            send the compressed packet group to the cache memory.

2. The apparatus of claim 1, wherein to generate the compressed packet, the compression/decompression circuit is further configured to:
    compare the given input word to a dictionary; and
    in response to a determination that a portion of the given input word matches an entry in the dictionary, generate a corresponding command that includes data indicative of which portion of the given input word matched the entry in the dictionary, and an index specifying the entry in the dictionary.

3. The apparatus of claim 1, wherein the compression/decompression circuit includes a read buffer and a write buffer, and wherein to receive the page of uncompressed data from the cache memory, the compression/decompression circuit is further configured to, upon receiving the page of uncompressed data, store the page of uncompressed data into the read buffer.

4. The apparatus of claim 1, wherein the compression/decompression circuit includes a write buffer, and wherein to send the compress packet group to the cache memory, the compression/decompression circuit is further configured to store the compressed packet group in the write buffer, and wherein the cache memory is further configured, in response to receiving the compressed packet group from the compression/decompression circuit, to transfer the compressed packet group to a memory using a first target address included in the compression command.

5. The apparatus of claim 1, wherein the compression/decompression circuit is further configured to:
  receive a decompression command to store an uncompressed version of a different page of compressed data, wherein the different page of compressed data includes a second plurality of compressed packets;
  send a second request to the cache memory for the different page of compressed data;
  wherein the cache memory is further configured to, in response to a determination that the different page of compressed data is not stored in the cache memory, initiate a prefetch of the different page of compressed data;
  wherein the compression/decompression circuit is further configured to:
    receive the different page of compressed data from the cache memory; and
    decompress each compressed packet of the second plurality of compressed packets included in the different page of compressed data to generate a plurality of output words; and
    send the plurality of output words to the cache memory.

6. A method, comprising:
  receiving, by a compression/decompression circuit coupled to a cache memory circuit, a compression command that includes a first source address for an uncompressed data page and a first target address to store a compressed version of the uncompressed data page;
  requesting, by the compression/decompression circuit, the uncompressed data page from the cache memory circuit;
  in response to determining that the uncompressed data page is not stored in the cache memory circuit, prefetching by the cache memory circuit using the first source address, the uncompressed data page from a memory circuit;
  in response to receiving the uncompressed data page by the cache memory circuit, transferring the uncompressed data page from the cache memory circuit to the compression/decompression circuit;
  compressing, by the compression/decompression circuit, a given input word of a plurality of input words included in the uncompressed data page to generate a compressed packet that includes a payload corresponding to the given input word, and a compression command specifying a type of compression used to compress the given input word;
  generating, using a plurality of compressed packets corresponding to the plurality of input words, a compressed packet group that includes a first part including a concatenation of payloads of the plurality of compressed packets, and a second part including a concatenation of compression commands included in the plurality of compressed packets; and
  transferring the compressed packet group to the cache memory circuit.

7. The method of claim 6, wherein compressing the given input word includes:
  comparing, by the compression/decompression circuit, the given input word to a dictionary; and
  in response to determining that a portion of the given input word matches an entry in the dictionary, generating, by the compression/decompression circuit, a corresponding command that includes data indicative of which portion of the given input word matched the entry in the dictionary, and an index specifying the entry in the dictionary.

8. The method of claim 6, further comprising:
  comparing, by the compression/decompression circuit, the given input word to a dictionary; and
  in response to determining that a particular portion of the given input word partially matches an entry in the dictionary:
    generating, by the compression/decompression circuit, a command that specifies a partial hit in the dictionary along with an index specifying the entry in the dictionary; and
    generating, by the compression/decompression circuit, a portion of payload that includes a remaining portion of the given input word that does not match the entry in the dictionary.

9. The method of claim 6, wherein transferring the uncompressed data page from the cache memory circuit to the compression/decompression circuit includes storing the uncompressed data page in a read buffer included in the compression/decompression circuit.

10. The method of claim 6, wherein transferring the compressed packet group to the cache memory circuit includes storing the compressed packet group in a write buffer included in the compression/decompression circuit, and further comprising, in response to receiving the compressed packet group from the compression/decompression circuit, transferring the compressed packet group to a memory using the first target address.

11. The method of claim 6, further comprising:
  receiving, by the compression/decompression circuit, a decompression command that includes a second source address for a page of compressed data and a second target address to store an uncompressed version of the page of compressed data, wherein the page of compressed data includes a second plurality of compressed packets;
  sending, by the compression/decompression circuit, a second request that includes the second source address to the cache memory circuit for the page of compressed data;
  in response to a determination that the page of compressed data is not stored in the cache memory circuit, initiating, by the cache memory circuit, a prefetch of the page of compressed data using the second source address;

receiving, by the compression/decompression circuit, the page of compressed data from the cache memory circuit; and decompressing, by the compression/decompression circuit, each compressed packet of the second plurality of compressed packets included in the page of compressed data to generate a plurality of output words; and sending, by the compression/decompression circuit, the plurality of output words to the cache memory circuit.

12. An apparatus, comprising:
a memory circuit configured to store a first plurality of pages of compressed data and a second plurality of pages of uncompressed data; and
a processor coupled to the memory circuit, wherein the processor includes a compression/decompression circuit configured to:
  receive a compression command that includes a first source address for an uncompressed data page and a first target address to store a compressed version of the uncompressed data page;
  request the uncompressed data page from a cache memory circuit included in the processor;
wherein the cache memory circuit is configured to:
  prefetch, using the first source address, the uncompressed data page from the memory circuit; and
  in response to receiving the uncompressed data page, transfer the uncompressed data page to the compression/decompression circuit;
wherein the compression/decompression circuit is further configured to:
  compress a given input word of a plurality of input words included in the uncompressed data page to generate a compressed packet that includes a payload corresponding to the given input word, and a compression command specifying a type of compression used to compress the given input word;
  generate, using a plurality of compressed packets corresponding to the plurality of input words, a compressed packet group that includes a first part including a concatenation of payloads of the plurality of compressed packets, and a second part including a concatenation of compression commands included in the plurality of compressed packets; and
  transfer the compressed packet group to the cache memory circuit.

13. The apparatus of claim 12, wherein to compress the given input word, the compression/decompression circuit is further configured to:
compare the given input word to a dictionary; and
in response to a determination that a portion of the given input word matches an entry in the dictionary, generate a corresponding command that includes data indicative of which portion of the given input word matched the entry in the dictionary, and an index specifying the entry in the dictionary.

14. The apparatus of claim 12, wherein the cache memory circuit is further configured to, in response to receiving the compressed packet group from the compression/decompression circuit, transfer, the compressed packet group to the memory circuit using the first target address.

15. The apparatus of claim 12, wherein to transfer the uncompressed data page to the compression/decompression circuit, the cache memory circuit is further configured to store the uncompressed data page in a read buffer included in the compression/decompression circuit.

16. The apparatus of claim 12, wherein the compression/decompression circuit includes a write buffer, and wherein to transfer the compressed packet group to the cache memory circuit, the compression/decompression circuit is further configured to store the compressed packet group in the write buffer.

17. The apparatus of claim 12, wherein the compression/decompression circuit is further configured to:
receive a decompression command that includes a second source address for a compressed data page and a second target address to store an uncompressed version of the page of compressed data, wherein the page of compressed data includes a second plurality of compressed packets; and
send a second request that includes the second source address to the cache memory circuit for the page of compressed data;
wherein the cache memory circuit is further configured to, in response to a determination that the page of compressed data is not stored in the cache memory circuit, initiate a prefetch of the page of compressed data using the second source address; and
wherein the compression/decompression circuit is further configured to:
  receive the page of compressed data from the cache memory circuit;
  decompress each compressed packet of the second plurality of compressed packets included in the page of compressed data to generate a plurality of output words; and
  send the plurality of output words to the cache memory circuit.

* * * * *